US008932631B2

(12) United States Patent
Bianchi et al.

(10) Patent No.: US 8,932,631 B2

(45) Date of Patent: Jan. 13, 2015

(54) AQUEOUS FORMULATIONS OF IMIDOALKANEPERCARBOXYLIC ACIDS

(75) Inventors: Ugo Piero Bianchi, Verona (IT); Roberto Garaffa, Milan (IT)

(73) Assignee: Solvay Solexis S.p.A., Milano (IT)

( * ) Notice: Subject to any disclaimer, the term of this patent is extended or adjusted under 35 U.S.C. 154(b) by 1653 days.

(21) Appl. No.: 10/585,659

(22) PCT Filed: Dec. 23, 2004

(86) PCT No.: PCT/EP2004/053685

§ 371 (c)(1), (2), (4) Date: Jan. 3, 2007

(87) PCT Pub. No.: WO2005/068470

PCT Pub. Date: Jul. 28, 2005

(65) Prior Publication Data

US 2009/0269408 A1 Oct. 29, 2009

(30) Foreign Application Priority Data

Jan. 8, 2004 (IT) .............................. MI2004A0004

(51) Int. Cl.

| | |
|---|---|
| ***A01N 43/38*** | (2006.01) |
| ***A01P 1/00*** | (2006.01) |
| ***C11D 3/39*** | (2006.01) |
| ***A01N 25/12*** | (2006.01) |
| *C11D 1/66* | (2006.01) |

(52) U.S. Cl.

CPC ................ *C11D 3/3945* (2013.01); *C11D 1/66* (2013.01)

USPC ............ 424/489; 510/405; 514/417; 548/479

(58) Field of Classification Search

CPC ...... C11D 3/3945; C11D 1/66; C11D 3/3956; C07D 209/48

See application file for complete search history.

(56) References Cited

U.S. PATENT DOCUMENTS

| | | | | |
|---|---|---|---|---|
| 5,391,324 A * | 2/1995 | Reinhardt et al. | ....... | 252/186.42 |
| 6,537,958 B1 * | 3/2003 | Di Capua et al. | ............. | 510/310 |
| 6,548,470 B1 * | 4/2003 | de Buzzaccarini et al. | ... | 510/372 |

FOREIGN PATENT DOCUMENTS

| | | | |
|---|---|---|---|
| EP | 0 442 549 | | 8/1991 |
| EP | 0442549 | * | 8/1991 |
| EP | 0780374 | * | 6/1997 |
| WO | 2004 007452 | | 1/2004 |

OTHER PUBLICATIONS

U.S. Appl. No. 10/592,538, filed Sep. 12, 2006, Bianchi, et al.
U.S. Appl. No. 10/592,719, filed Sep. 13, 2006, Bianchi, et al.

* cited by examiner

*Primary Examiner* — Suzanne Ziska
*Assistant Examiner* — Thurman Wheeler
(74) *Attorney, Agent, or Firm* — Oblon, Spivak, McClelland, Maier & Neustadt, L.L.P.

(57) ABSTRACT

Liquid formulations of imidoalkanepercarboxylic acids, in the form of aqueous dispersions comprising, in percentages by weight relative to the total weight of the composition: A) from ≥7% to 40% and preferably from 10% to 20% of imidoalkanepercarboxylic acids having the general formula (I), the said imidoalkanepercarboxylic acids being in the β form and having a dissolution time, determined via the test of the rate of dissolution at a temperature of 40° C. or 18° C., of not more than 5 minutes when determined at 40° C. or 15 minutes when determined at 18° C., for an amount of dissolved acid equal to 99% of the theoretical amount; B) from 0.001% to 0.9% of a nonionic surfactant; the said dispersions having a viscosity of not more than 2000 mPa·sec at 25° C. by applying a shear rate of 20 $s^{-1}$; in which the dissolution time of the component A), determined via the test of the rate of dissolution at a temperature of 40° C. or 18° C., is not more than 5 minutes when determined at 40° C. or 15 minutes when determined at 18° C., for an amount of dissolved acid equal to 99% of the theoretical amount, as defined in the rate of dissolution test; the said dispersions in the test of stability at 40° C. for seven days show variations in viscosity of not more than 300 mPa·sec; the said aqueous formulations being obtainable by grinding the crystals of imidoalkanepercarboxylic acids in α form dispersed in an excess of water, in the presence of a surfactant chosen from nonionic surfactants; cooling the liquid dispersion to a temperature below 30° C.

(I)

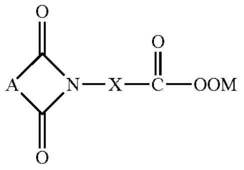

17 Claims, No Drawings

AQUEOUS FORMULATIONS OF IMIDOALKANEPERCARBOXYLIC ACIDS

This application is a 371 of PCT/EP2004/053685, filed Dec. 23, 2004.

The present invention relates to concentrated aqueous formulations of imidoalkanepercarboxylic acids in β-crystal form, which may be obtained by heating concentrated formulations of imidoalkanepercarboxylic acids in the α-crystal form, the said aqueous formulations having the following properties: viscosity of less than 2000 mPa·sec at a temperature of 25° C., by applying a shear rate of 20 $s^{-1}$; maintenance of the physical stability, i.e. variations in viscosity of not more than 300 mPa·sec, preferably less than 150 mPa·sec and even more preferably less than 100 mPa·sec, when the said formulations are subjected to the test of accelerated ageing for seven days at 40° C.; maintenance of the chemical stability, i.e. loss of peroxide oxygen content of not more than 2% and preferably not more than 1%, relative to the initial value, when the said formulations are subjected to the accelerated ageing test as defined above; improved bleaching and disinfecting efficacy together with reduced dissolution times for the imidoalkanepercarboxylic acids.

More particularly, the formulations of the present invention are concentrated aqueous formulations of imidoalkanepercarboxylic acids in the β-crystal form, which may be obtained by heating concentrated formulations of imidoalkanepercarboxylic acids in the α-crystal form, in which the concentration of imidoalkanepercarboxylic acids is between 7% and 40% and preferably from 10% to 20% by weight relative to the weight of the formulation, and having a viscosity of less than 2000 mPa·sec at a temperature of 25° C., by applying a shear rate of 20 $s^{-1}$.

Patent application PCT/EP 03/07303 in the name of the Applicant describes imidoalkanepercarboxylic acids in α form and related formulations. In particular, water-based formulations containing microcrystals in β form and characterized by reduced dissolution times are described. Formulations with 5% by weight of PAP having dissolution times $t_{99}$, measured at 25° C., of less than 10 minutes are illustrated. Formulations with a high concentration of imidoalkanepercarboxylic acids, of greater than 5% by weight, are not illustrated in the said patent application, and in particular the viscosity and the physical stability of the aqueous formulations, understood as being a variation in the viscosity over time, are not described. The aqueous formulations with a high concentration of imidoalkanepercarboxylic acids should have a viscosity of less than 2000 mPa·sec, measured under the conditions indicated above, and a variation in viscosity, in the physical stability test indicated above, of less than 300, preferably less than 150 and even more preferably less than 100 mPa·sec, to be able to be used as liquid formulations.

There is a need for concentrated liquid formulations of imidoalkanepercarboxylic acids in β-crystal form that have the following combination of properties:

- viscosity of less than 2000 mPa·sec at a temperature of 25° C., by applying a shear rate of 20 $s^{-1}$;
- maintenance of the physical stability, i.e. variations in viscosity of not more than 300 mPa·sec, preferably less than 150 mPa·sec and even more preferably less than 100 mPa·sec, when the said formulations are subjected to the test of accelerated ageing for seven days at 40° C. and then cooled to 25° C. for the viscosity determination;
- maintenance of the chemical stability, i.e. loss of peroxide oxygen content of not more than 2% and preferably not more than 1% relative to the initial value, when the said formulations are subjected to the accelerated ageing test as defined above;
- improved bleaching and disinfecting efficacy, together with reduced dissolution times for the imidoalkanepercarboxylic acids.

The Applicant has found, surprisingly and unexpectedly, formulations of aqueous dispersions of imidoalkanepercarboxylic acids that solve the technical problem indicated above.

One subject of the present invention is liquid formulations of imidoalkanepercarboxylic acids in the form of aqueous dispersions comprising, in percentages by weight relative to the total weight of the composition:

A) from ≥7% to 40% and preferably from 10% to 20% of imidoalkanepercarboxylic acids having the general formula (I)

(I)

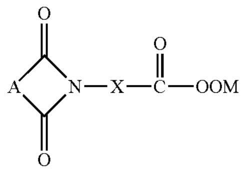

in which A indicates a group chosen from the following

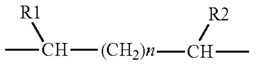

or

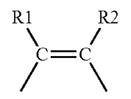

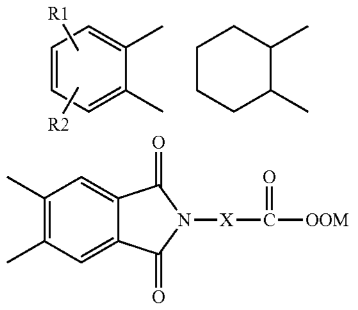

in which:

n is an integer 0, 1 or 2,

R1 has one of the following meanings: hydrogen, chlorine, bromine, $C_1$-$C_{20}$ alkyl, $C_2$-$C_{20}$ alkenyl, aryl or alkylaryl, R2 is hydrogen, chlorine, bromine or a group chosen from the following:—

$SO_3M$, —$CO_2M$, —$CO_3M$ or —$OSO_3M$,

M means hydrogen, an alkali metal, ammonium or an equivalent of an alkaline-earth metal, X indicates a $C_1$-$C_{19}$ alkylene or an arylene;

the said acids being in the β-crystal form;

B) from 0.001% to 0.9%, preferably from 0.005% to 0.3% and even more preferably from 0.01% to 0.1% of a surfactant chosen from nonionic surfactants;

the difference to 100% consisting of water and of other optional additives for detergent formulations;

the said dispersions having a viscosity of not more than 2000 mPa·sec at 25° C. by applying a shear rate of 20 $s^{-1}$;

in which the dissolution time of the component A), determined via the test of the rate of dissolution at a temperature of 40° C. or 18° C., is not more than 5 minutes when determined at 40° C. or 15 minutes when determined at 18° C. for an amount of dissolved acid equal to 99% of the theoretical amount, as defined in the rate of dissolution test;

the said dispersions in the test of stability at 40° C. for seven days show variations in viscosity of not more than 300 mPa·sec, preferably less than 150 mPa·sec and even more preferably less than 100 mPa·sec, the viscosity being determined under the conditions indicated above.

The aqueous formulations of the invention can be obtainable by grinding the crystals of imidoalkanepercarboxylic acids in α form dispersed in an excess of water, in the presence of a surfactant chosen from nonionic surfactants; cooling the liquid dispersion to a temperature below 30° C.

The expression "α-crystal form of imidoalkanepercarboxylic acids" means a crystal form that is stable on storage in solid form and that, when dispersed in water, converts into crystals of the β-crystal form, which is the crystal form known in the art and is stable in aqueous medium, the said crystals of β-crystal form having average dimensions of less than 30 microns, preferably less than 10 microns, more preferably less than 8 microns and particularly less than or equal to 2 microns; the α-crystal form being characterized, relative to the β-crystal form that is known in the ark in that the related spectra obtained via the techniques of x-ray diffraction and surface in spectroscopy (IR/S) show, relative to those of the β form of the same peracid, a different x-ray spectral image and a shift of the typical absorption in the region 1697-1707 $cm^{-1}$ in IR/S towards higher frequencies, of the order of about 8-10 $cm^{-1}$. The crystals of the α form are of the same water-solubility as the crystals of the prior art (β form). They therefore form aqueous dispersions.

In particular, in the case of ϵ-phthalimidoperoxyhexanoic acid (PAP), the β form known in the prior art shows:

- in the x-ray spectrum: typical peaks at 18.0 and 18.7 and no quartet at 24.2-25.0 [°2θ],
- in the IR/S spectrum: typical peak with absorption maximum in the range 1699-1704 $cm^{-1}$, for anhydrous crystals with a water absorption at 3450-3500 $cm^{-1}$ of less than 5%;

whereas, for the same compound PAP, the α form shows the following spectral characteristics:

- in the x-ray spectrum: typical peaks at 17.5 and 19.0 and a typical quartet at 24.2-25.0 [°2θ],
- in the IR/S spectrum: typical peak with absorption maximum in the range 1707-1712 $cm^{-1}$ for anhydrous crystals, which have a water absorption at 3450-3500 $cm^{-1}$ of less than 5%.

The x-ray spectrum is acquired on samples of powders dried for 48 hours at 20° C. under vacuum (residual pressure of 10 mm Hg).

The said α-crystal form is thus distinguishable from the β-crystal form known in the prior art of this imidoalkanepercarboxylic acid not only via the characterization techniques indicated above, but also and mainly by the fact that, when suspended in water, it transforms spontaneously into stable crystals of a different form (β), which are stable in water and have average dimensions of less than 30 microns, preferably less than 10 microns, more preferably less than 8 microns and in particular of about 2 microns.

The formulations of the present invention may be used in the field of detergency and disinfection.

In addition, liquid formulations with a high concentration of imidoalkanepercarboxylic acids, component A), of compositions of the present invention show high chemical stability, as demonstrated by the test of stability at 40° C. for seven days, in which the said acids show a loss of peroxide oxygen content of not more than 2% and preferably not more than 1% relative to the initial titre.

The imidoalkanepercarboxylic acids in α-crystal form obtained by the process indicated above are stable in solid form and, as mentioned, are clearly distinguished from the said acids in the β-crystal form by the property of spontaneously converting into the corresponding microcrystals of β form by simple contact with an aqueous phase. In the formulations of the present invention, ϵ-phthalimidoperoxyhexanoic acid is preferably used as peracid component A).

The Applicant has found, surprisingly and unexpectedly, that, in the preparation of liquid formulations with a high concentration of imidoalkanepercarboxylic acids, for example at 10% by weight or more, relative to the total weight of the formulation, in the absence of surfactants or in the presence of anionic surfactants, starting with peracids in α form, in the stage for conversion of the acid from the α form to the β form, the viscosity of the preparations increases uncontrollably and the formulation converts from an aqueous dispersion to a mass of pasty consistency. Consequently, this pasty mass can no longer be used as a liquid formulation for the bleaching and disinfecting applications of imidoalkanepercarboxylic acid dispersions.

Tests performed by the Applicant have shown that it is only possible to obtain the formulations described above, with imidoalkanepercarboxylic acid concentrations of more than or equal to 7%, having a viscosity of less than 2000 mPa·sec and a variation in viscosity in the physical stability test indicated above of less than 300 mPa·sec, if the process is performed according to the process described below.

The liquid formulations of the invention allow a substantial reduction in the costs of manufacturing, storing and transporting imidoalkanepercarboxylic acids for liquid formulations that may be used for bleaching and disinfecting. The reason for this is that very high concentrations of imidoalkanepercarboxylic acids may also be prepared.

Any nonionic surfactant or mixture of nonionic surfactants may be used in the liquid formulations according to the present invention. The said surfactants are substances that are well known to those skilled in the art. Mention may be made, for example, of the book "Nonionic surfactants", Ed M. J. Schick, Marcel Dekker 1967, pp. 76-85 and 103-141. They are preferably ethoxylated, polyethoxylated, propoxylated or polypropoxylated nonionic surfactants or surfactants containing one or more propoxy repeating units and one or more ethoxy units. Examples of these surfactants are the surfactants known in the industry under the trade names Triton® X100 (Dow), Tergitol®D TMN100x (Dow), Antarox® 863 (Rhodia), Rhodasurf® 870 (Rhodia), Genapol® X080 (Clariant), Genapol® X020 (Clariant), Genapol® X060 (Clariant), Genapol® X040 (Clariant) and Lutensol® XL40 (BASF). Polyethoxylated or polypropoxylated nonionic surfactants with a number of ethoxy or propoxy groups of less than or equal to 15 are even more preferred; even more preferably, the number of ethoxylated groups is less than or equal to 5; for nonionic surfactants containing propoxy and ethoxy units, the number of ethoxy groups is not more than 10 and the number of propoxy units is not more than 2.

The polyethoxylated surfactants as defined above are preferably used.

The rate of dissolution is determined via the following test. A sample of 500 mg of the formulation is dispersed in one liter of solution prepared with water with a hardness equal to 10° F. and 1.70 g of standard detergent base, in the absence of bleaching additives (IEC detergent type B, with phosphates—IEC publication 60456), with stirring and thermostatically maintained at a temperature of 18° C., or 40° C. Successive samples of liquid phase, carefully filtered through a 0.45 micron filter, are taken. The times at which the samples are taken, measured from the moment of mixing of the two compositions, are plotted on a graph on the x-axis, and the areas of the imidoalkanepercarboxylic acid peak, determined by HPLC analysis, are plotted on the y-axis. The time at which the amount of dissolved peroxy acid corresponds to 99% ($t_{99}$%) of the peroxy acid recalculated taking the concentration obtained asymptotically at infinite time (theoretical concentration) to be 100% is determined from the graph.

The test of stability at 40° C. for seven days is performed in a ventilated oven, the liquid formulations being kept in hermetically closed containers, such that the free surface of the dispersion is 2-3 mm from the inner surface of the lid.

The liquid compositions of the present invention may optionally contain other conventional additives or ingredients known for detergent and disinfecting formulations. These ingredients may be dissolved in aqueous solution and/or dispersed in the suspension together with the imidoalkanepercarboxylic acids. Examples of optional additives are those that can contribute towards further increasing the chemical and physical stability of the formulation. Mention may be made of paraffins, phosphonic acids, optionally hydroxylated carboxylic acids and dicarboxylic acids, etc. Other optional ingredients may be washing co-adjuvants and/or agents for optimizing the pH of the washing bath. Examples of these ingredients are phthalic acids, for example terephthalic acid, and adipic acid.

The "α-crystal" form is obtained via the synthetic process comprising the following steps:

I) peroxidation in the presence of aqueous hydrogen peroxide solution and a strong acid, generally at a temperature of between 5° C. and 50° C., of an imidoalkanecarboxylic acid precursor that may be obtained by reacting:

a) an anhydride of formula:

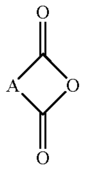

or the corresponding acids, A being a group chosen from the following:

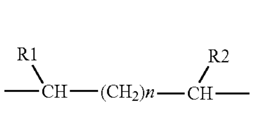

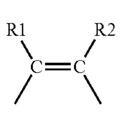

or

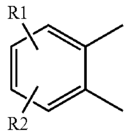

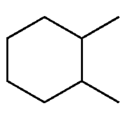

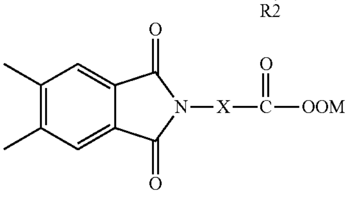

in which:

n is an integer 0, 1 or 2,

R1 has one of the following meanings: hydrogen, chlorine, bromine, $C_1$-$C_{20}$ alkyl, $C_2$-$C_{20}$ alkenyl, aryl or alkylaryl, R2 is hydrogen, chlorine, bromine or a group chosen from the following: —$SO_3$M, —$CO_2$M, —$CO_3$M or —$OSO_3$M, M means hydrogen, an alkali metal, ammonium or an equivalent of an alkaline-earth metal, X indicates a $C_1$-$C_{19}$ alkylene or an arylene;

b1) an amino acid of formula:

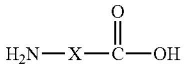

X being as defined above, or b2) a lactam of general formula:

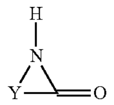

Y having the meanings of X, preferably a $C_3$-$C_{19}$ alkylene;

c) water;

at a temperature of between 100° C. and 250° C., under pressure of an inert gas of from 1 to 30 bar (0.1-3 MPa), for reaction times of from 1 to 20 hours;

II) production of a molten phase of eutectic composition of the imidoalkaneperoxycarboxylic acids of formula (I) (ref. page 8) by heating an aqueous suspension of the said peracids until the solid has completely melted, the said eutectic material having a molar composition of not more than two mol of water/mole of peracid;

III) separation of the molten organic phase of eutectic composition from the aqueous phase in equilibrium and recovery of the molten organic phase containing the imidoalkanepercarboxylic acid;

IV) rapid cooling (quenching) of the molten organic phase and production of the α phase, which is stable in solid form.

The rapid cooling (quenching) in step IV) of the process may be performed in various ways, for example by dripping the molten organic phase of eutectic composition into liquid nitrogen. Another quenching method is, for example, to drip into cold water, with stirring, at a temperature, for example, of less than 15° C. To obtain the α form alone, a person skilled in the art is readily capable of determining the most suitable temperature, given that by increasing the temperature together with the α form, the β form may be simultaneously obtained. Another quenching method is to percolate the molten phase on a surface, for example a metal surface, or on two coupled surfaces, for example metal surfaces, cooled to temperatures below 30° C.

In step I), the molar ratio generally between a/(b1 or b2)/c is between 1/0.8:1.2/0.5:3. Preferably, the molar ratio a/(b1 or b2)/c is between 1/1.01:1.1/0.5:2.5 and more preferably between 1/1.05:1.1/1-2.

In step I), it is preferred to react the anhydride a), or the corresponding acid, with the lactam b2).

Among the compounds of class a1) that may be mentioned are the following anhydrides or the corresponding acids: succinic anhydride, glutaric anhydride, maleic anhydride, trimellitic anhydride, phthalic anhydride, pyromellitic anhydride and alkyl- or alkenylsuccinic anhydrides. Phthalic anhydride or phthalic acid is preferably used.

Among the compounds of class b1) that may be mentioned are the following: omega-aminobutyric acid, omega-aminovaleric acid, omega-amino caproic acid and omega-aminolauric acid.

Among the preferred compounds of class b2) that may be mentioned are: gamma-pyrrolidone, delta-piperidone, epsilon-caprolactam and omega-laurolactam, epsilon-caprolactam (CPL) being particularly preferred.

Preferably, in stage I), the temperature is between 130° C. and 180° C. and the pressure is between 4 and 8 bar.

At the end of stage I), a solvent is preferably added, preferably $CH_2Cl_2$ and $CHCl_3$, more preferably $CH_2Cl_2$, to facilitate the subsequent peroxidation of the product.

In point of fact, the latter solvents are, as described in patent application EP 780 373 in the name of the Applicant, the most suitable for performing the subsequent peroxidation operation.

Among the imidoalkanepercarboxylic acids that may be mentioned are phthalimidoperacetic acid, ϵ-phthalimidoperoxyhexanoic acid, 3-phthalimidoperpropionic acid, 4-phthalimidoperbutyric acid, 2-phthalimidodiperglutaric acid, 2-phthalimidodipersuccinic acid, 3-phthalimidoperbutyric acid, 2-phthalimidoperpropionic acid, 3-phthalimidodiperadipic acid, naphthalimidoperacetic acid and 2-phthalimidomonopersuccinic acid.

In stage II), sequestering agents may be added to the aqueous phase to reduce the amount of water. Examples that may be mentioned include hydroxycarboxylic acids, for instance citric acid; aminopolycarboxylic acids, for instance ethylenediaminotetramethylphosphonic (EDTMP) acid; pyridinecarboxylic acids, for instance dipicolinic acid; polyphosphonic acids, for example 1-hydroxyethylene-1,1-diphosphonic (HEDP) acid.

The imidoalkaneperoxycarboxylic acids of α-crystal form obtained by the process indicated above are stable in solid form and, as mentioned, are markedly distinguished from the same acids in β-crystal form by the property of spontaneously converting into the corresponding microcrystals of β form by simple contact with an aqueous phase.

Another subject of the present invention is a process for obtaining the aqueous formulations of imidoalkanepercarboxylic acids as defined above, comprising.

- grinding at a temperature of from 40° C. to 65° C. crystals of imidoalkanepercarboxylic acids in α form dispersed in an excess of water, the said excess preferably being at least 2 parts by weight of water/1 part by weight of percarboxylic acid, in the presence of a surfactant chosen from nonionic surfactants;
- cooling the liquid dispersion to a temperature below 30° C., preferably below 25° C., optionally with the addition of viscosifying additives.

In the compositions according to the present invention, other types of surfactants other than nonionic surfactants must not be simultaneously present.

Preferably, the grinding is performed in a colloidal mill or in another type of mill provided with a rotor and stator and optionally with radial flow, for example a Silverson mill.

Generally, the temperatures to which the liquid dispersion are cooled are not less than 4° C.

The process according to the present invention may be performed in a short time, for example of the order of a few hours; this is advantageous for the use of a chemical plant since it is compatible with the usual operating times.

As mentioned, the formulations of the present invention maintain substantially the same viscosity over time, which remains at less than 2000 mPa·sec, and a variation in viscosity in the physical stability test mentioned above of less than 300 mPa·sec, preferably less than 150 mPa·sec and even more preferably less than 100 mPa·sec, the viscosity being determined under the conditions mentioned above.

In addition, the liquid formulations with a high concentration of imidoalkanepercarboxylic acids of the present invention show high chemical stability, as shown by the stability test indicated above, in which the said acids show a loss of peroxide oxygen content of not more than 2% and preferably not more than 1% relative to the initial value.

In addition, the dissolution times of the imidoalkanepercarboxylic acids, contained in the form of a dispersion in the formulations of the invention, for uses in the domestic or industrial washing of fabrics, or for other uses, are very short. Thus, the bleaching and disinfecting power of the concentrated formulations of the invention is maintained at optimum levels during use.

The aqueous formulations of the invention, which may be obtained from imidoalkanepercarboxylic acids in α-crystal form, are particularly advantageous in applications of industrial type, when it is important to ensure the quality of the formulation both as regards the substantial consistency of the viscosity among subsequent production batches, and as regards the absence of solid residues capable of soiling the water feed circuits and in particular the retention valves of the metering pumps. As mentioned above, this is surprising and unexpected. Specifically, the Applicant has found that when aqueous formulations of the imidoalkanepercarboxylic acids in 0 form of the prior art are prepared on an industrial scale, using known grinding techniques, for instance colloidal grinding, production batches are obtained in which the variation of the viscosity between different batches increases as the percarboxylic acid content increases. Thus, in this case, it is not possible to obtain concentrated formulations whose characteristics are extremely uniform from batch to batch, as would be desirable.

The following examples are given as non-limiting illustrations of the present invention.

EXAMPLES

Determination of the Dynamic Viscosity

The viscosity was determined in a TA Instruments® model AR 500 rotary viscometer, at a temperature of 25° C. and at a shear rate of 20 $s^{-1}$, using a parallel spindle 4 cm in diameter.

Determination of the PAP Titre

The analysis is performed by iodometric titration, by titration with thiosulfate of the iodine, which is released from the reaction with the compound in the formulation, according to the following method.

An accurately weighed amount of 500 mg of the formulation is diluted in 100 ml of water, and 10 ml of glacial acetic acid and 30 ml of aqueous 10% w/w potassium iodide solution are then added. The iodine produced from the reaction is titrated with an aqueous sodium thiosulfate solution of known titre, using a Mettler® DL 40 potentiometric titrator equipped with a platinum electrode and a reference electrode.

Determination of the Rate of Dissolution of the PAP of a Formulation in an Aqueous Solution of a Standard Detergent Base The rate of dissolution is determined by the following method A sample of 500 mg of the formulation is dispersed in one liter of solution prepared with water with a hardness of 10° F. and 1.70 g of standard detergent base, free of bleaching additives (IEC detergent type B, with phosphates—IEC publication 60456), kept stirred and thermostatically regulated at a temperature of 18° C. or 40° C. Successive samples of liquid phase, carefully filtered through a 0.45 micron filter, are taken. The times at which the samples are taken, measured from the moment of mixing of the two compositions, are plotted on a graph on the x-axis. The times used, expressed in minutes, were as follows: 1, 3, 5, 10, 15, 30, 60, 120. The areas of the PAP peak, determined by HPLC analysis, are plotted on the y-axis of the graph. The times at which the amount of dissolved PAP corresponds, respectively, to 98% ($t_{98\%}$), 99% ($t_{99\%}$) and 99.8% ($t_{99.8\%}$) of the peroxy acid present, determined by taking the concentration of PAP obtained asymptotically at infinite time (theoretical concentration) as 100%, are determined from the graph obtained Test of Stability for Seven Days at 40° C.

The test of stability at 40° C. for seven days is performed in a ventilated oven, the liquid formulations being kept in hermetically closed containers, such that the free surface of the dispersion is 2-3 mm from the inner surface of the lid.

Example 1A Comparative

Cold Preparation of a Water-Based Concentrated Formulation, Comprising an Anionic Surfactant and an Amount of PAP Equal to 20% by Weight Relative to the Total Weight, Starting with PAP in β-Crystal Form A formulation with a final concentration of 20% by weight of active PAP is prepared from a commercial batch of the peroxy acid in β form (Eureco W Solvay Solexis, 73% titre) containing in 719 g of water 274 g of PAP and the following substances in the amounts indicated, expressed as percentages by weight relative to the finished product:

Hostapur SAS anionic surfactant (Clariant), 0.1%;

HEDP Sequion 10H60 (Bozzetto), 0.1%.

The suspension is ground at room temperature (20° C.) in a Fryma MZ80 colloidal mill, the dimensions of the flow aperture through the rotor and the stator of the apparatus being gradually reduced until, after repeated treatments in the mill, the suspension flows freely even through the smallest aperture present in the mill. Next the suspension is treated in a mill of Coball microsphere type. The substance below is then added in the amount indicated, expressed as a percentage by weight relative to the finished product, to the suspension with stirring, over 30 minutes, at a temperature of 20° C.:

Kelzan S xanthan gum (Kelco), 0.5%.

The example is summarized in Table 1.

The suspension obtained is chemically and physically stable even after conditioning at a temperature of 40° C. and in an oven for seven days. The data relating to the stability test (pH, dynamic viscosity and PAP titre) are given in Table 1.

The dissolution times for the peracid present in the formulation, determined at a temperature of 40° C., $T_{98\%}$, $T_{99\%}$, $T_{99.8\%}$ in the standard detergent solution, are given in Table 2.

The tables illustrate that the preparation of this example has good chemical and physical stability but that the rate of dissolution is unsatisfactory.

Example 2 Comparative

Preparation of PAP in α-Crystal Form 1000 ml of "Micropure Grade" demineralized water and 5 g of hydroxyethylidenediphosphonic (HEDP) acid (from Bozzetto: HEDP 10H60) are introduced into a 2000 ml jacketed beaker equipped with a bottom drain valve, and the solution is heated to about 78° C. 1000 g of technical grade crystalline PAP (Ausimont, Eureco® W type) are then added. The mixture is stirred at a speed of about 250 rpm until the PAP has melted, which tales place when the temperature of the system rises again to a value of about 78° C. At this temperature, the two liquid phases that have been formed, the organic phase consisting of the PAP eutectic material with water and the aqueous phase, respectively, are transparent. The stirring is reduced to 20 rpm and clean separation of the two phases is obtained, with the heavier organic phase collecting at the bottom.

About 2500 ml of liquid nitrogen are placed in a Dewar flask and a magnetic anchor is placed therein to stir the liquid by magnetic stirring, this container being positioned directly underneath the drain valve of the jacketed beaker containing the molten organic phase at the bottom.

The bottom valve of the jacketed beaker is slowly opened and the liquid is allowed to drip into the liquid nitrogen phase.

The operation is stopped as soon as the upper level of the molten organic phase in the jacketed beaker reaches the bottom valve. The solidified PAP is separated from the nitrogen that is still liquid, the solid being collected with a rounded spatula and transferred into a low-temperature-resistant plastic basin.

After bringing the product to room temperature, the PAP granules are dried by drying under vacuum, at a residual pressure of about 10 mm Hg, at a temperature of not more than 20° C. The sample, with a weight of about 70 g of crystalline PAP, is characterized by the techniques of x-ray diffraction and surface infrared spectroscopy (IR/S). The spectra obtained are consistent with the α form.

X-ray: typical peaks at 17.5 and 19.0 and typical quartet at 24.2-25.0 [°2θ]. IR/S: typical peak with absorption maximum in the range 1707-1712 $cm^{-1}$ (anhydrous crystals: absorption at 3450-3500 reduced by 5%). The PAP titre is 83.7%.

Example 2A Comparative

Cold Preparation of a Water-Based Concentrated Formulation, Comprising an Anionic Surfactant and an Amount of PAP Equal to 20% by Weight Relative to the Total Weight, Starting with PAP in α-Crystal Form Added at Room Temperature (20° C.)

A formulation with a final concentration of 20% by weight of active PAP of Example 2 is prepared, containing in 711 g of water 239 g of PAP in α form and also the following substances in the amounts indicated, expressed as percentages by weight relative to the finished product:

Hostapur SAS anionic surfaatant (Clariant), 0.1%;

HEDP Sequion 10H60 (Bozzetto), 0.1%.

The suspension obtained is ground at mom temperature (20° C.) in a Fryma MZ80 colloidal mill, the dimensions of the flow aperture through the rotor and the stator of the apparatus being gradually reduced until, after repeated treatments in the mill, the suspension flows freely even through the smallest aperture present in the mill.

The substance below is then added in the amount indicated, expressed as a percentage by weight relative to the finished product, to the suspension with stirring, over 30 minutes, at a temperature of 20° C.:

Kelzan S xanthan gum (Kelco), 0.3%.

The pH of the formulation is 3.10.

Repeating the stability test in an oven at 40° C., the suspension obtained stays chemically stable, since the titre of the active principle remains constant. As regards the physical properties of the formulation, it is observed that during the first hours of conditioning, the viscosity of the formulation increases substantially and the liquid suspension becomes converted into a non-fluid paste.

The example is summarized in Table 1, which also gives the results of the stability test.

The dissolution times for the formulation, determined at 40° C. as indicated above, are given in Table 2.

The table illustrates that the concentrated formulation of this example, compared with that of the preceding example, has a higher rate of dissolution but has the drawback of being unstable on storage.

Example 2B Comparative

Hot Preparation of a Water-Based Concentrated Formulation, Comprising an Anionic Surfactant and an Amount of PAP Equal to 20% by Weight Relative to the Total Weight, Starling with Pap in α-Crystal Form, Working at a Temperature of 45° C.

A formulation is prepared by adding to 711 g of water PAP in α form with the same additives (anionic surfactant and Sequion HEDP) in the same amounts indicated in Example 2A (final concentration of PAP: 20% by weight). The initial dispersion of the peroxy acid is ground under the same conditions as described in Example 2A. Next, the dispersion is heated, with stirring, and is maintained at a temperature of 45° C., to effect the conversion into the stable p form.

After maintaining at 45° C. for five minutes, it is observed that the viscosity of the formulation increases very quickly and a non-fluid paste is obtained, which is similar in consistency to that obtained in Example 2A during the stability test.

Under these conditions, it was not possible to determine the rate of dissolution.

The mixture is cooled to 20° C. and xanthan gum (Kelzan S-Kelco) is added in the same amount as indicated in Example 2A.

The example is summarized in Table 1, which also gives the results of the stability test.

After conditioning at 40° C. for seven days, it was found that the PAP titre did not vary significantly. See Table 1.

The example demonstrates that, stating with PAP in α form, using an anionic surfactant, it is not possible to prepare a concentrated formulation that maintains useful rheological characteristics.

Example 2C Comparative

Hot Preparation of a Water-Based Formulation, Comprising an Anionic Surfactant and an Amount of PAP Equal to 5% by Weight Relative to the Total Weight, Stating with Pap in α-Crystal Form Comparative Example 2B is repeated, but with the following differences:

- PAP in α-crystal form of Example 2 is used, but in an amount such as to have a concentration of 5% by weight in the final formulation;
- terephthalic acid is added in an amount such as to have a weight percentage of 2% relative to the total weight of the composition.

The example is summarized in Table 1, which also gives the results of the stability test.

The suspension obtained is chemically and physically stable, even after conditioning at a temperature of 40° C. in an oven for seven days as reported in Table 1.

The dissolution times at 40° C., $T_{98\%}$, $T_{99\%}$, $T_{99.8\%}$ in the standard detergent solution, are given in Table 2.

The tables illustrate that a formulation prepared starting with PAP in α form and having a PAP concentration of 5% has good chemical and physical stability and a high rate of dissolution. In addition, the viscosity is optimum even when terephthalic acid, which is sparingly soluble in the dispersion, is present in the formulation.

Example 2D

Hot Preparation of Water-Based Concentrated Formulation with a PAP Concentration of 20%, Starting with PAP in α-Crystal Form in the Presence of a Nonionic Surfactant The procedure for preparing of water-based PAP formulation containing 20% of active PAP in α-crystal form, using a nonionic surfactant (polyethoxylated), is described below.

The following components:

- HEDP Sequion 10H60 (Bozzetto) 16.7 g (final concentration: 1.67% by weight);
- sodium hydroxide (solution at 50% by weight) 3.6 g;
- Genapol X020 polyethoxylated (2-5 EO) nonionic surfactant (Clariant) 0.5 g (final concentration: 0.05% by weight)

are added in order to a 1500 ml jacketed beaker containing 590.2 g of water, the liquid phase being kept stirred by means of a variable-speed motor set at 120 revolutions per minute and equipped with an anchor stirring shaft.

The solution obtained is heated and maintained at a constant temperature of 45° C. by means of a water-circulating thermostat connected to the jacket of the beaker.

While stirring, the PAP in α-crystal form prepared in Example 2 is fed in, in a total amount of 239 g (final concentration: 20% by weight) over a period of at least 60 minutes, by means of small successive additions. During the addition, the mass is kept stirred at a temperature of 45° C. and is simultaneously sent for grinding in a colloidal mill or in a Silverson mill. Five minutes after the end of the addition of PAP the grinding is stopped and stirring is continued for a further 60 minutes. The temperature of the thermostatic bath is lowered to 20° C. and the mass is left for the time required for it to cool down. 150 g of a solution at 2% by weight of xanthan gum (0.3% weight concentration) are then added. The product is left to homogenize by gentle stirring for ten minutes.

The example is summarized in Table 1, which also gives the results of the stability tests.

The product obtained is chemically and physically stable in the test of stability at 40° C. in an oven for seven days.

See Table 1.

The dissolution times $T_{98\%}$, $T_{99\%}$, $T_{99.8\%}$ measured at a temperature of 40° C. in the standard detergent solution are given in Table 2.

The tables illustrate that the formulation of Example 2D has both good chemical and physical stability and a high rate of dissolution in the standard aqueous detergent base.

The rate of dissolution in the aqueous base is greater than that of the formulation of the comparative Example 2A, which contains an anionic surfactant and is prepared from PAP in α form at the same concentration of 20%.

In addition, the rate of dissolution is compatible with that of the formulation of the comparative Example 2C, which contains an amount by weight of PAP which is four times smaller.

Example 3

Hot Preparation of a Water-Based Concentrated Formulation with a PAP Concentration of 20%, Starting with PAP in α-Crystal Form in the Presence of a Nonionic Surfactant Example 2D is repeated, but working at 60° C. instead of at 45° C. and using the polyethoxylated (6-15 EO) nonionic surfactant Genapol X080 instead of the polyethoxylated (2-5 EO) nonionic surfactant Genapol X020.

The example is summarized in Table 1, which also gives the results of the stability tests.

The product obtained is chemically and physically stable in the stability test at 40° C. in an oven for seven days.

See Table 1.

The dissolution times $T_{98\%}$, $T_{99\%}$, $T_{99.8\%}$ measured at a temperature of 18° C. in the standard detergent solution are given in Table 2.

The tables illustrate that the formulation of Example 3 has good chemical and physical stability. The rate of dissolution in the standard aqueous detergent base remains high, even when the temperature at which the test was performed is very much lower than that used in the preceding examples (40° C.).

Example 4

Hot Preparation of a Water-Based Concentrated Formulation with a PAP Concentration of 20%, Starting with PAP in α-Crystal Form in the Presence of a Mixture of Nonionic Surfactants Example 3 is repeated, but using a mixture of nonionic surfactants formed by 80% by weight of Genapol X020 and 20% by weight of Genapol X080. The total amount of nonionic surfactant is 0.05% by weight, as in Example 3.

The example is summarized in Table 1, which also gives the results of the stability tests.

The product obtained is chemically and physically stable in the stability test at 40° C. in an oven for seven days.

See Table 1.

The dissolution times $T_{98\%}$, $T_{99\%}$, $T_{99.8\%}$ measured at a temperature of 18° C. in the standard detergent solution are given in Table 2.

The tables illustrate that the formulation of Example 4 has good chemical and physical stability. The rate of dissolution in the standard aqueous detergent base is high.

Example 5

Hot Preparation of a Water-Based Concentrated Formulation with a PAP Concentration of 20%, Starting with PAP in α-Crystal Form in the Presence of a Mixture of Nonionic Surfactants Example 3 is repeated, but using a mixture of nonionic surfactants formed by 20% by weight of Genapol X020 and 80% by weight of Genapol X080. The total amount of nonionic surfactant is 0.05% by weight, as in Example 3.

The example is summarized in Table 1, which also gives the results of the stability tests.

The product obtained is chemically and physically stable in the test of stability at 40° C. in an oven for seven days.

See Table 1.

The dissolution times $T_{98\%}$, $T_{99\%}$, $T_{99.8\%}$ measured at a temperature of 18° C. in the standard detergent solution are given in Table 2.

The tables illustrate that the formulation of Example 5 has good chemical and physical stability. The rate of dissolution in the standard aqueous detergent base is high.

Example 6

Hot Preparation of a Water-Based Concentrated Formulation with a PAP Concentration of 20%, Starting with PAP in α-Crystal Form in the Presence of a Nonionic Surfactant Example 3 is repeated, but using an amount of Genapol X080 of 0.15% by weight relative to the total weight of the formulation.

The example is summarized in Table 1, which also gives the results of the stability tests.

The product obtained is chemically and physically stable in the test of stability at 40° C. in an oven for seven days.

See Table 1.

The dissolution times $T_{98\%}$, $T_{99\%}$, $T_{99.8\%}$ measured at a temperature of 18° C. in the standard detergent solution are given in Table 2.

The tables illustrate that the formulation of Example 6 has good chemical and physical stability.

Example 7

Hot Preparation of a Water-Based Concentrated Formulation with a PAP Concentration of 10%, Starting with PAP in α-Crystal Form in the Presence of a Nonionic Surfactant Example 3 is repeated, except that the percentage of PAP in the final product is 10% by weight, the polyethoxylated (2-5 ERR) nonionic surfactant Genapol X020 is used and the surfactant concentration is 0.02% by weight.

The example is summarized in Table 1, which also gives the results of the stability tests.

The product obtained is chemically and physically stable in the test of stability at 40° C. in an oven for seven days.

See Table 1.

The dissolution times $T_{98\%}$, $T_{99\%}$, $T_{99.8\%}$ measured at a temperature of 18° C. in the standard detergent solution are given in Table 2.

The tables illustrate that the formulation of Example 7 has good chemical and physical stability. The rate of dissolution in the standard aqueous detergent base is very high.

TABLE 1

| | Formulations | | | | | | | | | | | |
|---|---|---|---|---|---|---|---|---|---|---|---|---|
| | PAP | | T (° C.) Prep. | Surfactant | | pH | | Viscosity (mPa · s) | | PAP Titre (weight %) | | |
| EX | Cryst. Form | Weight % | Form. | Type | Weight % | $t_o$ | Fin. | $t_o$ | Fin. | $t_o$ | Fin. | Δ % |
| Determination of pH, dynamic viscosity and PAP titre of the exemplified formulations at zero time ($t_o$) and after conditioning at 40° C. during 7 days (Fin.). A = Genapol X020. B = Genapol X080 | | | | | | | | | | | | |
| 1A comp. | Beta | 20 | 20 | Anionic | 0.1 | 3.10 | 3.05 | 948 | 980 | 19.58 | 19.55 | 0.15 |
| 2A comp. | Alpha | 20 | 20 | Anionic | 0.1 | 3.10 | n.d. | 680* | $>10^4$ | 19.75 | 19.72 | 0.15 |
| 2B comp. | Alpha | 20 | 40 | Anionic | 0.1 | 3.10 | n.d. | $>10^4$ | — | 19.89 | 19.43 | 2.31 |

TABLE 1-continued

| | Formulations | | | | | | | | | | | |
|---|---|---|---|---|---|---|---|---|---|---|---|---|
| | PAP | | T (° C.) Prep. | Surfactant | | pH | | Viscosity (mPa · s) | | PAP Titre (weight %) | | |
| EX | Cryst. Form | Weight % | Form. | Type | Weight % | $t_o$ | Fin. | $t_o$ | Fin. | $t_o$ | Fin. | Δ % |
| 2C comp. | Alpha | 5 | 45 | Anionic | 0.1 | 3.20 | 3.10 | 445 | 460 | 4.98 | 4.65 | 6.60 |
| 2D | Alpha | 20 | 45 | Nonionic (A) | 0.05 | 3.5 | 3.5 | 734 | 756 | 19.50 | 19.45 | 0.25 |
| Determination of pH, dynamic viscosity and PAP titre of the exemplified formulations at zero time ($t_o$) and after conditioning at 40° C. during 7 days | | | | | | | | | | | | |
| 3 | Alpha | 20 | 60 | Nonionic (B) | 0.05 | 3.28 | 3.29 | 875 | 870 | 19.91 | 19.84 | 0.35 |
| 4 | Alpha | 20 | 60 | Nonionic 80% A + 20% B | 0.05 | 3.30 | 3.32 | 650 | 658 | 20.74 | 20.65 | 0.43 |
| 5 | Alpha | 20 | 60 | Nonionic 20% A + 80% B | 0.05 | 3.33 | 3.36 | 758 | 763 | 20.25 | 20.16 | 0.44 |
| 6 | Alpha | 20 | 60 | Nonionic (B) | 0.15 | 3.26 | 3.30 | 1300 | 1356 | 20.38 | 20.22 | 0.78 |
| 7 | Alpha | 10 | 60 | Nonionic (A) | 0.02 | 3.10 | 3.06 | 450 | 465 | 10.15 | 10.05 | 0.98 |

*during the first hours of conditioning, the dispersion turns into a pasty mass

**5 min after the PAP dispersion has reached 45° C. and is maintained at this temperature, a pasty mass is formed

TABLE 2

Dissolution rate of PAP in a diluted aqueous solution of a standard detergent base at a temperature of 40° C. (°°) in the ex. 1A comp - 2D and at 18° C. in the others

| | Formulations | | | | | | | |
|---|---|---|---|---|---|---|---|---|
| | PAP | | T (° C.) Prep. | Surfactant | | | | |
| EX | Cryst. Form | Weight % | Form. | Type | Weight % | $t_{98\%}$ | $t_{99\%}$ | $t_{99.8\%}$ |
| 1A comp. | Beta | 20 | 20 | Anionic | 0.1 | 6.5°° | 16°° | 65°° |
| 2A comp. | Alpha | 20 | 20 | Anionic | 0.1 | <5°° | 5°° | 18°° |
| 2C comp. | Alpha | 5 | 45 | Anionic | 0.1 | <<5°° | <5°° | 10°° |
| 2D | Alpha | 20 | 60 | Nonionic (A) | 0.05 | <<5°° | <5°° | 12°° |
| 3 | Alpha | 20 | 60 | Nonionic (B) | 0.05 | 5 | 7 | 10 |
| 4 | Alpha | 20 | 60 | Nonionic 80% A + 20% B | 0.05 | 3 | 5 | 9 |
| 5 | Alpha | 20 | 60 | Nonionic 20% A + 80% B | 0.05 | 4 | 5 | 8 |
| 6 | Alpha | 20 | 60 | Nonionic (B) | 0.15 | 7 | 10 | 15 |
| 7 | Alpha | 10 | 60 | Nonionic (A) | 0.02 | <3 | 5 | 8 |

The invention claimed is:

1. A liquid formulation of imidoalkanepercarboxylic acid in the form of an aqueous dispersion comprising water and, in percentages by weight relative to the total weight of the dispersion:

A) from 7% to 40% of at least one imidoalkanepercarboxylic acid in the β-crystal form having the general formula (I)

(I)

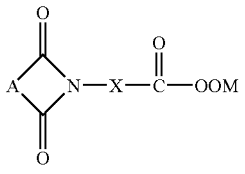

in which A is selected from the following group

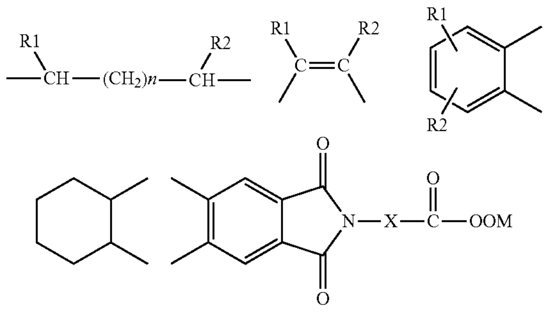

in which:

n is an integer 0, 1 or 2,

R1 is hydrogen, chlorine, bromine, $C_1$-$C_{20}$ alkyl, $C_2$-$C_{20}$ alkenyl, aryl or alkylaryl, R2 is hydrogen, chlorine, bromine, $—SO_3M$, $—CO_2M$, $—CO_3M$ or $—OSO_3M$, M is hydrogen, an alkali metal, ammonium or an equivalent of an alkaline-earth metal, X is a $C_1$-$C_{19}$ alkylene or an arylene; and B) from 0.005%-0.3% of a nonionic surfactant;

wherein:

the dispersion has a viscosity of not more than 2000 mPa·sec at 25° C. when applying a shear rate of 20 $s^{-1}$;

the dissolution time of component A), determined by testing the rate of dissolution at a temperature of 40° C. or 18° C., is not more than 5 minutes when determined at 40° C. or 15 minutes when determined at 18° C., for an amount of dissolved acid equal to 99% of the theoretical amount;

the dispersion has variations in viscosity of not more than 300 mPa·sec in the test of stability at 40° C. for seven days;

the formulation is prepared by grinding crystals of said at least one imidoalkanepercarboxylic acid in α form dispersed in an excess of water, in the presence of the nonionic surfactant; and cooling the liquid dispersion to a temperature below 30° C., and the at least one imidoalkanepercarboxylic acid, component A), form stable solid α-crystals, and are converted into stable crystals of the n-crystal form, in aqueous medium, the crystals of β-crystal form having average dimensions of less than 30 microns, wherein the α-crystal form, relative to the β-crystal form has a different x-ray spectral image and a shift of the absorption in the region 1697-1707 $cm^{-1}$ in surface infrared spectroscopy towards higher frequencies, of the order of 8-10 $cm^{-1}$.

2. The formulation according to claim 1, wherein in the test of stability at 40° C. for seven days, the at least one imidoalkanepercarboxylic acid, component A), show a loss of peroxide oxygen content of not more than 2% relative to the initial titre.

3. The formulation according to claim 1, wherein the nonionic surfactant is selected from the group consisting of ethoxylated, polyethoxylated, propoxylated or polypropoxylated nonionic surfactants or surfactants containing one or more propoxy repeating units and one or more ethoxy units.

4. The formulation according to claim 3, wherein the polyethoxylated or polypropoxylated nonionic surfactants have a number of ethoxy or propoxy repeating groups of less than or equal to 15; the nonionic surfactants containing propoxy and ethoxy units have a number of ethoxy groups of not more than 10 and a number of propoxy units of not more than 2.

5. The formulation according to claim 4, wherein the surfactants are ethoxylated surfactants.

6. The formulation according to claim 1, further comprising one or more detergent or disinfecting additives dissolved in aqueous solution and/or dispersed in the suspension together with the at least one imidoalkanepercarboxylic acid, component A).

7. The formulation according to claim 6, further comprising at least one additive selected from the group consisting of paraffins, phosphonic acids, hydroxylated carboxylic acids, dicarboxylic acids, co-adjuvants, phthalic acids, adipic acid, and mixtures thereof.

8. The formulation according to claim 1, wherein the formulation is prepared by grinding at a temperature of from 40° C. to 65° C. crystals of said at least one imidoalkanepercarboxylic acid in α form dispersed in an excess of water, the said excess being at least 2 parts by weight of water/1 part by weight of percarboxylic acid, in the presence of said nonionic surfactant to form a liquid dispersion;

cooling the liquid dispersion to a temperature below 30° C. and optionally adding one or more viscosifying additives.

9. The formulation according to claim 1, wherein the cooling occurs at a temperature not less than 4° C.

10. The formulation according to claim 1, comprising 0-phthalimidoperoxyhexanoic acid.

11. The formulation according to claim 1, wherein A is:

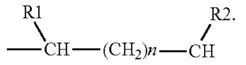

12. The formulation according to claim 1, wherein A is:

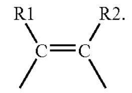

13. The formulation according to claim 1, wherein A is:

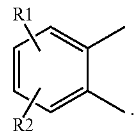

14. The formulation according to claim 1, wherein A is:

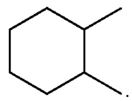

15. The formulation according to claim 1, wherein A is:

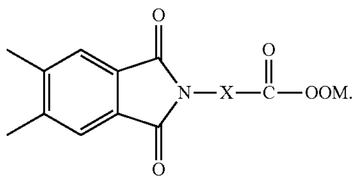

16. The formulation according to claim 1, comprising from 7% to 40% of 0-phthalimidoperoxyhexanoic acid as the at least one imidoalkanepercarboxylic acid in the β-crystal form.

17. The formulation according to claim 3, comprising from 7% to 40% of 0-phthalimidoperoxyhexanoic acid as the at least one imidoalkanepercarboxylic acid in the β-crystal form.

* * * * *